United States Patent [19]

Gasbarro

[11] Patent Number: 5,395,283
[45] Date of Patent: Mar. 7, 1995

[54] AUTOMATIC TENDON REMOVAL APPARATUS

[76] Inventor: Geno N. Gasbarro, 1401-B Lakeshore Dr., Columbus, Ohio 43204

[21] Appl. No.: 216,797

[22] Filed: Mar. 23, 1994

[51] Int. Cl.⁶ ............................................. A22C 17/00
[52] U.S. Cl. ..................................... 452/172; 452/117
[58] Field of Search ............... 452/172, 117, 119, 115, 452/112, 137

[56] References Cited

U.S. PATENT DOCUMENTS

| | | | |
|---|---|---|---|
| 3,613,153 | 10/1971 | McDonald | 452/172 |
| 3,714,682 | 2/1973 | Harben, Jr. | 452/115 |
| 4,292,710 | 10/1981 | Townsend | 452/127 |
| 4,359,807 | 11/1982 | Adkison et al. | 452/172 |
| 4,551,885 | 11/1985 | Molnar | 452/119 |

FOREIGN PATENT DOCUMENTS

213829  9/1984  Germany .............................. 452/119

*Primary Examiner*—Willis Little
*Attorney, Agent, or Firm*—Francis T. Kremblas, Jr.

[57] ABSTRACT

An apparatus for automatically removing the tendon from the tenderloin fillet of a poultry breast which includes a continuous conveyor for carrying the fillet of meat to a tendon gripping and pulling station mounted adjacent to the conveyor. The conveyor comprises a plurality of laterally extending trays adapted to receive a meat fillet and each tray includes a slot at the outer or lateral edge thereof for receiving an exposed strip portion of the major tendon contained in the fillet. The exposed strip of tendon in the slot hangs downwardly below the tray. The tendon gripping and supporting assembly is mounted below the upper run of trays on the conveyor and is aligned with the path of the slots in the trays moving along the conveyor. The latter assembly includes a rotating cylindrical member provided with radial extending fins which cooperates with an arcuate wall surface mounted closely adjacent to the path of the outer ends of the fins to entrap the strip of tendon hanging through the slot in the conveyor tray between the outer end of rotating fin and the fixed arcuate wall surface to securely grip and pull the tendon strip downwardly and away from the meat fillet on the conveyor tray as the meat fillet continues toward a collection station.

3 Claims, 8 Drawing Sheets

Fig. 8

AUTOMATIC TENDON REMOVAL APPARATUS

TECHNICAL FIELD

The present invention relates to apparatus for automatically removing tendon from a fillet of meat.

BACKGROUND

The meat industry has faced the problem of removing the tough and unpalatable tendon tissue from meat fillets for many years. This problem is particularly troublesome in the poultry industry wherein the large tendon in breast tenderloin fillets is a particularly undesirable trait in providing a high grade meat portion for several food applications.

Presently the most commonly used methods involve manual cutting or trimming the tendon from the breast fillet using a knife or manually pulling the tendon with a pair of pliers to tear the tendon from the meat fillet. Both of these methods involve undesirably high labor costs.

There has been several prior attempts to automate the tendon removal process as evidenced by the apparatus disclosed in U.S. Pat. Nos. 4,723,341; 5,133,688 and 4,359,807, for example.

Of these examples, U.S. Pat. No. 4,723,341 is more closely related to the present invention but uses a very different structural combination which has not been widely accepted as sufficiently satisfactory for adoption by the industry to replace manual processing methods.

Therefore there has long been a well-recognized, but unfulfilled need for an efficient, high production and economical automated tendon removal apparatus in the meat industry in general, and in particular, in the poultry industry where large volumes of the part of a turkey breast known in the industry as tenders or tenderloins are processed to meet various food applications.

BRIEF DISCLOSURE OF INVENTION

The present invention relates to an apparatus for the removal of tendons from a meat fillet and, in particular, the removal of the large tendon which extends through a breast fillet of poultry, such as turkey for example.

The present invention includes a base supporting a continuous belt type conveyor and a tendon gripping and pulling assembly mounted adjacent the conveyor. The conveyor preferably includes a stainless steel surface for receiving the meat fillets which have been priorly processed to expose an outer portion of the tendon which extends essentially the length of the main body of the fillet. The conveyor surface is also provided with a plurality of open ended slots spaced along a lateral edge for receiving the exposed length of tendon and disposing a portion of the same in a vertically extending position below the upper surface of the conveyor.

The tendon gripping and pulling assembly forms a tendon removal station mounted adjacent to and below the conveyor's upper surface in a position to engage and entrap the vertically depending portion of a tendon of a meat fillet as it travels along the conveyor and forcefully pulls separates the tendon from the meat fillet.

The engaging and pulling assembly includes a fixed pinch block having an arcuate wall surface facing a rotating cylindrical member provided with outwardly extending fins having outer edges which travel in closely spaced relationship to the arcuate wall surface in a manner to engage the exposed downwardly depending end portion of the tendon between the rotating outer edge and the wall surface to entrap the tendon and pull it downwardly from the meat fillet as the latter continues to move along the conveyor.

The travel of the meat fillets after tendon removal continues to a separate unloading and collection station while the removed tendon is collected separately.

As one aspect of the present invention, a high volume automated tendon removal apparatus is provided which efficiently removes the tendon from the fillet in a simple, consistent and dependable manner.

As another aspect of the present invention, the loading and unloading functions are achieved in a simple manner to allow relatively unskilled labor to be employed without sacrificing production rates or quality.

As another aspect of the present invention, a second gripping and pulling assembly can be conveniently mounted adjacent the opposite lateral edge of the conveyor such that one conveyor surface can be efficiently used to double the production rate and lower the effective capital expense of the apparatus.

DETAILED DESCRIPTION

Figure 1:
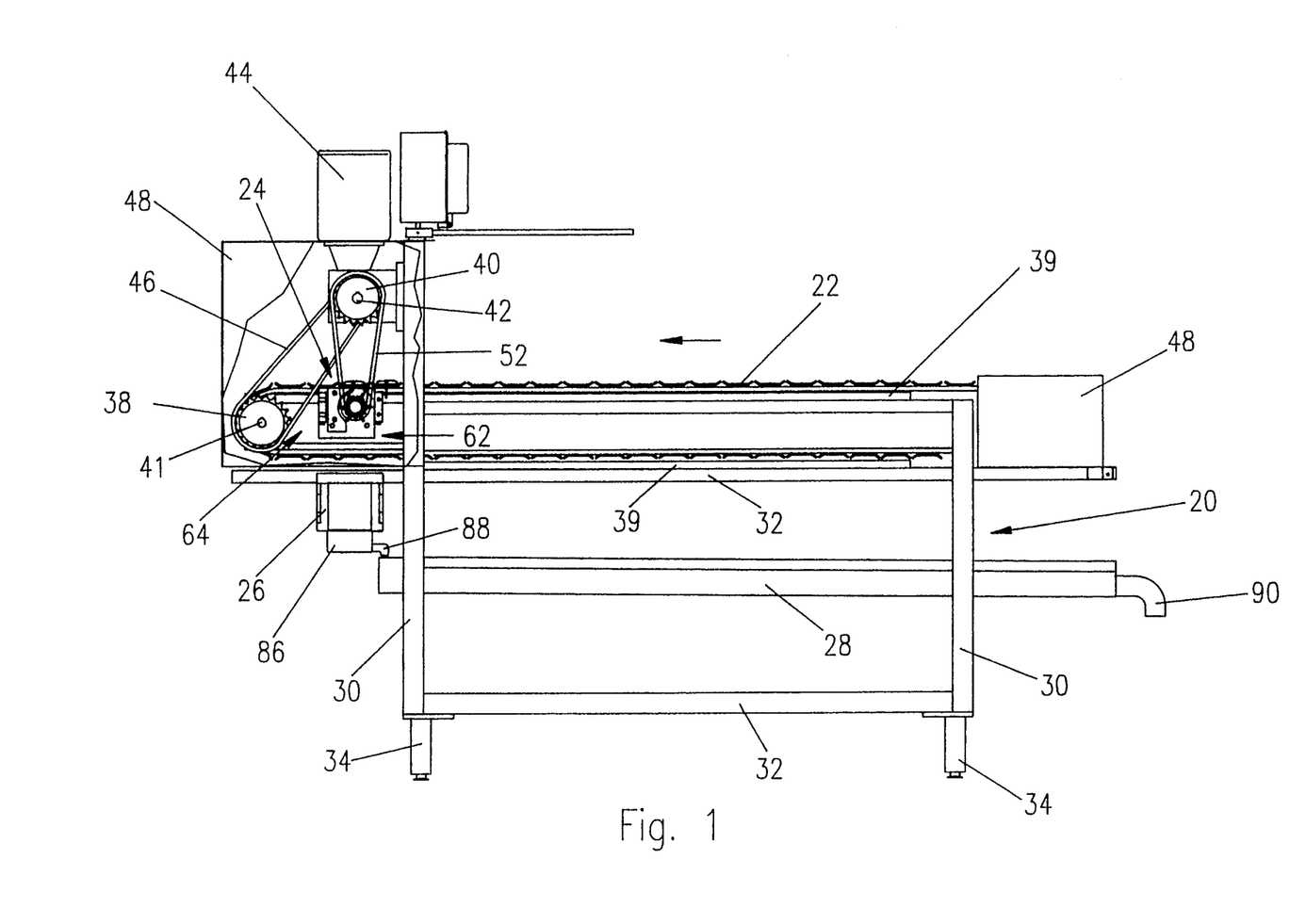
FIG. 1 is a side elevational view of an automated tendon removal apparatus constructed in accordance with the present invention, a side cover or guard plate is shown partially removed to expose the tendon gripping and pulling assembly.
Figure 2:
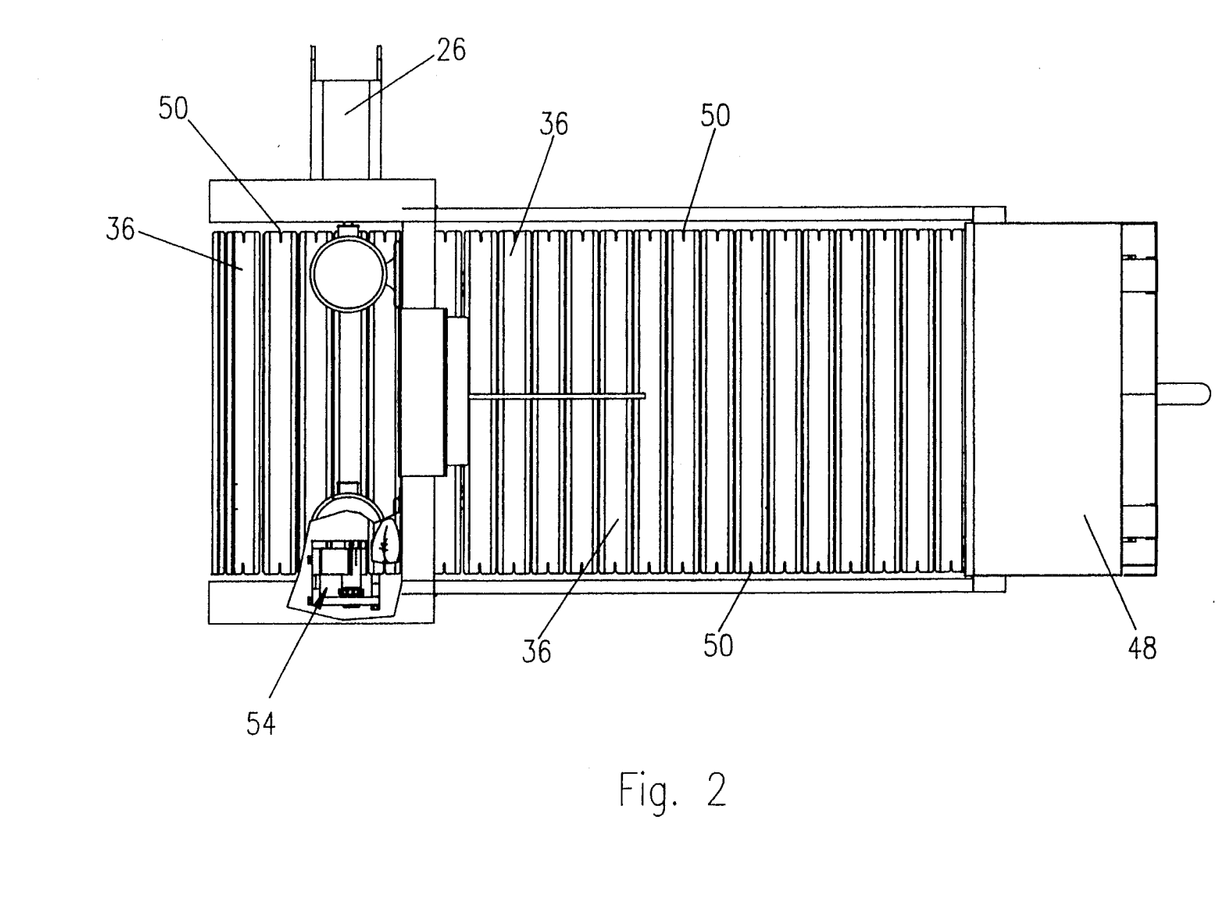
FIG. 2 is a top plan view of the apparatus shown in FIG. 1, a portion of the guard plate and drive motor housing being removed to expose the gripping and pulling assembly.
Figure 3:
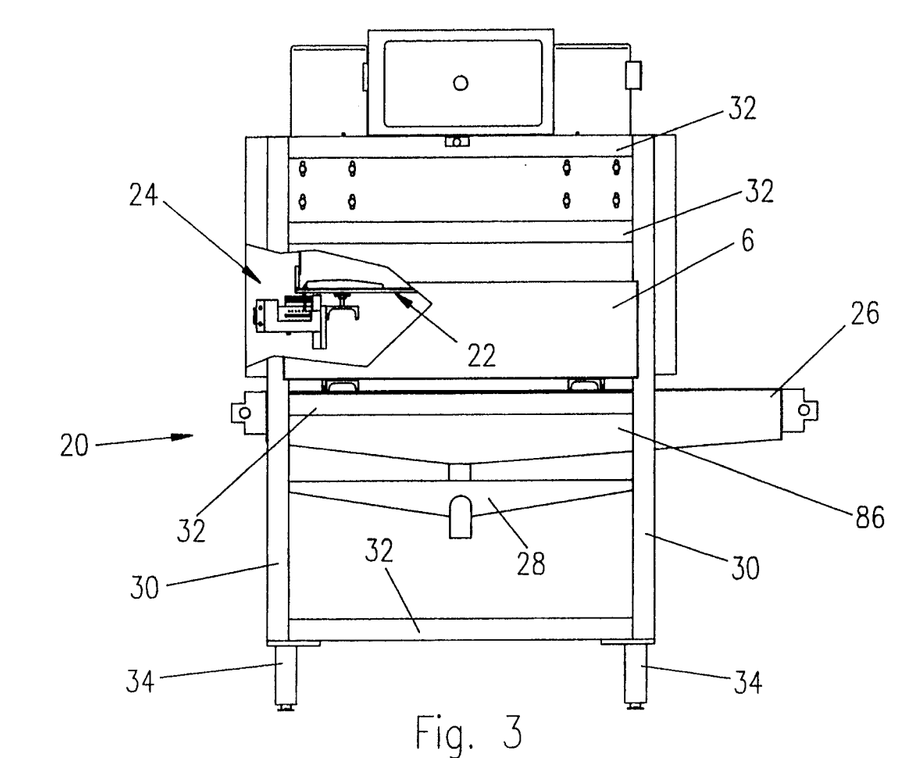
FIG. 3 is a front elevational view of the apparatus shown in the preceding figures, a portion of the front chain guard housing and frame being removed to expose the gripping and pulling assembly.

An apparatus for automatically removing tendons from meat fillets, constructed in accordance with the present invention, is shown in FIGS. 1–3 and includes a frame or support base, indicated generally at 20. Mounted to base 20 are a conveyor for loading and carrying meat fillets, a tendon removal station, indicated generally at 24, a tendon collection tray and conveyor 26 and water collection tray 28.

Frame 20 includes vertical support members 30 and horizontal support members 32. Foot portions 34 are provided at each corner of the generally rectangular frame which provide a base to support the associated components including the endless chain conveyor 22.

Conveyor 22 preferably comprises a plurality of separate plates, such as 36, which extend laterally across frame 20 and are fixedly mounted in any well-known conventional manner to a pair of spaced endless chains. Other equivalent forms of a suitable conveyor structures for carrying the meat fillets along an appropriate path in a similar fashion would work well in connection with the present invention.

One convenient construction for a suitable conveyor merely involves providing several small metal mounting plates fixed in any conventional manner across the upper portion of a conventional chain and spaced along the length thereof to accommodate fixing each metal plate 36 to a respective opposing pair of mounting plates. The chain with mounting plates as described is a well-known commercially available item such as that offered by the Ohio Transmission Co. and identified as a "SST chain No. 60; K4, every 4 links" Any conventional manner of fixing the small mounting plates to the chains and the plates 36, such as bolts, rivets, welding or the like, could be employed without departing from the spirit of the present invention claimed herein.

Plates 36 are preferably made of stainless steel to meet the requirements of the food handling industry, however, any material which exhibits equivalently acceptable characteristics could be used.

Each of the laterally spaced conveyor chains are conventionally mounted at one of their ends on a driven sprocket assembly, such as 38, which is operatively connected to an inner one of a pair of drive sprockets, such as 40 which are mounted in spaced relationship on a gear box shaft 42 which is operatively driven by a conventional electric motor 44. The inwardly disposed one of sprockets 40 is connected to sprocket 38 via chain 46 while the outer sprocket 40 is connected to a sprocket associated with the tendon pulling assembly described later herein. The relative diameters between the sprocket 38 and the inner one of sprockets 40 may be selected to determine the speed of advance of conveyor 22. The opposing right end side of each of the chains supporting the conveyor 22 are conventionally mounted on a respective idler sprocket, not shown, which is conventionally mounted to frame 20 and preferably surrounded by a chain guard housing mounted on frame 20, such as 48, for safety reasons.

Figure 6:
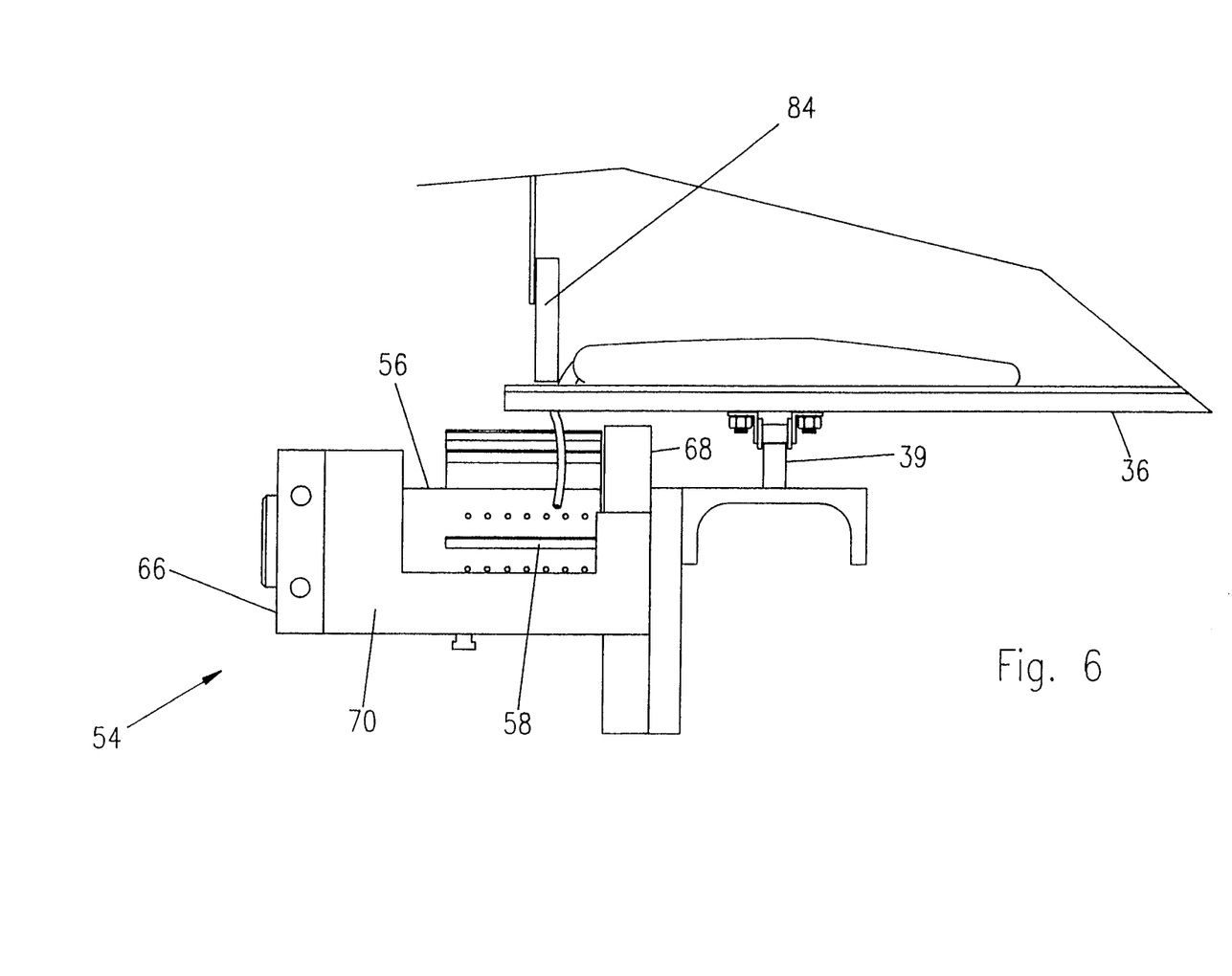
FIG. 6 is a front elevational view of the portion of the apparatus shown in FIGS. 4 and 5.

Further, as is conventionally well-known, the upper and lower runs of conveyor 22 are preferably supported by a guide rail fixed to the frame. A delron guide rail is preferred to reduce friction between the chain in the upper run and trays 36 in the lower run which contact the guide rails 39 as seen in FIGS. 1 and 6.

Further, it is preferable to provide each side of conveyor 22 with a tendon-removal station to increase production capacity, however, a description of the operation on only one side should be understood by one skilled in the art to also describe the necessary duplicate assembly portions for operating simultaneously on the opposing side of conveyor 22.

Each plate 36 is provided with a tendon receiving opening, preferably in the form of an open-ended slot 50 disposed at each outer end of each plate 36 to accommodate a production line operation on each side of conveyor 22. However, use of only one side falls within the spirit of the present invention as a matter of choice for the user's particular needs.

Figure 7:
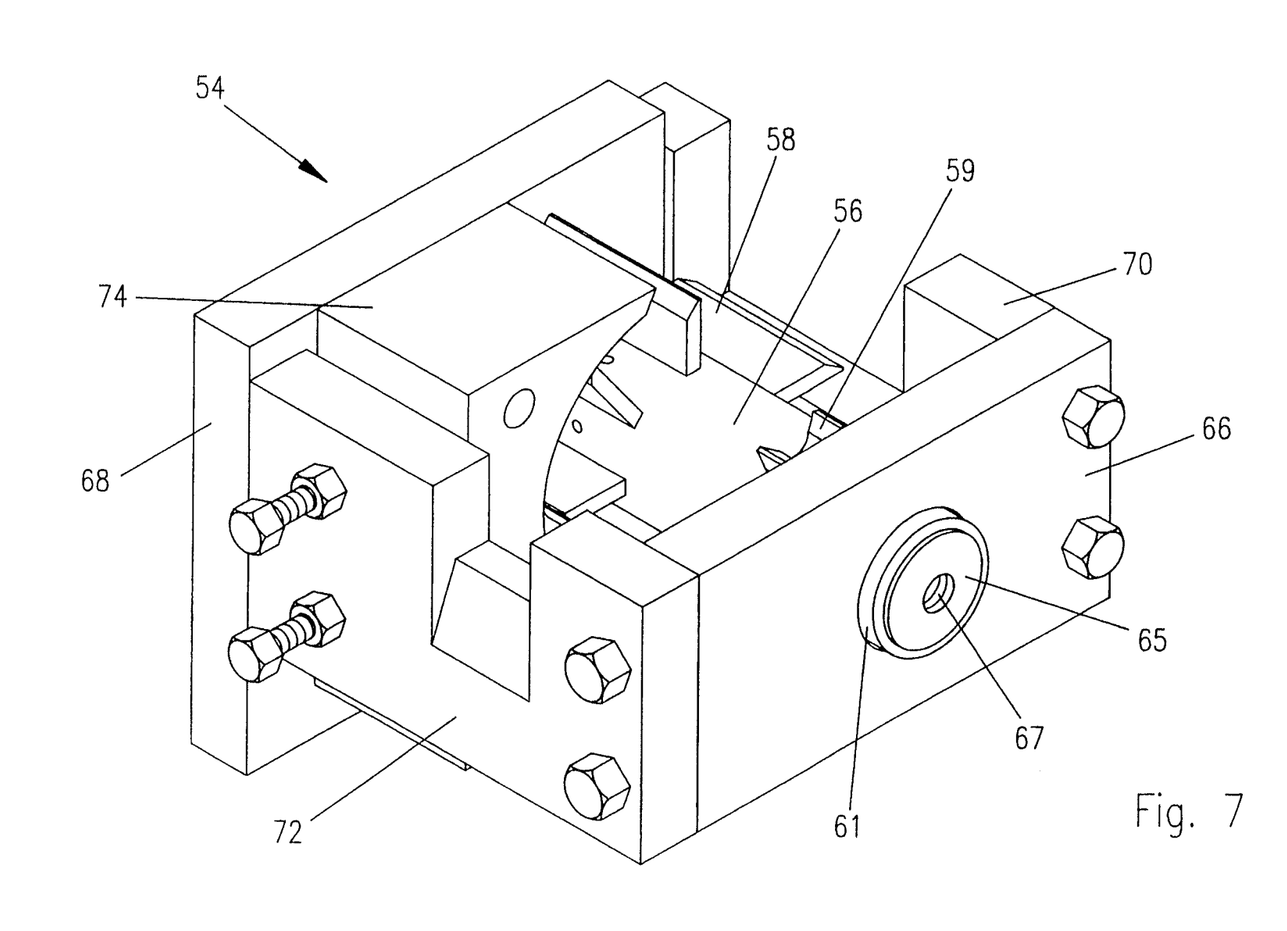
FIG. 7 is a perspective view of the gripping and pulling assembly illustrated in FIGS. 4–6 shown removed from the remainder of the apparatus.
Figure 8:
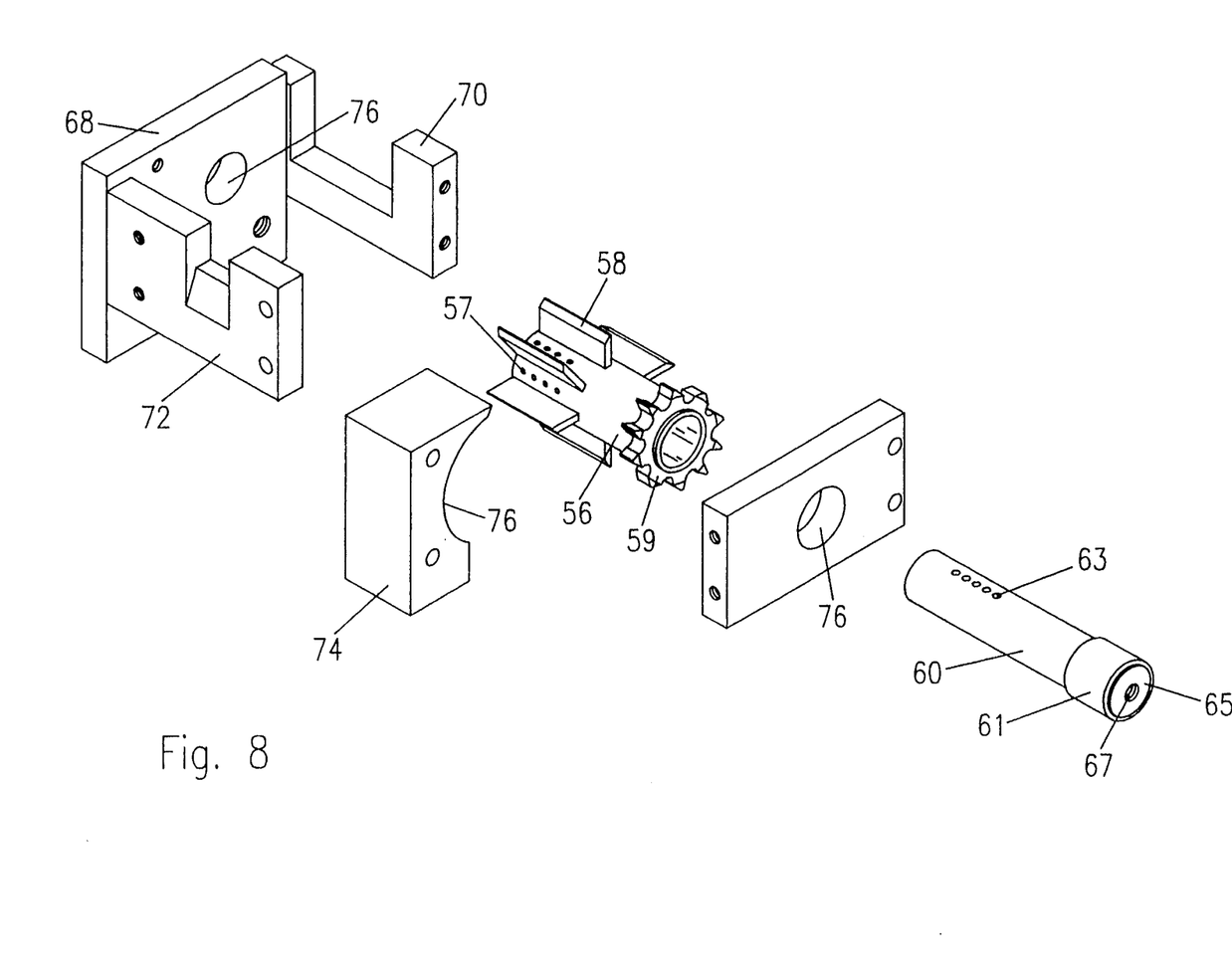
FIG. 8 is an exploded perspective view of the gripping and pulling assembly shown in FIG. 7.

Near the left end of conveyor 22, as seen in FIG. 1, a tendon removal station, indicated generally at 24, is mounted on base 20. As best seen in FIGS. 6 and 7, it includes a tendon engaging and pulling assembly indicated generally at 54 which comprises a hollow shaft 56 carrying a plurality of fixed radially extending fins 58 and a sprocket 59 fixed to the outer end of shaft 56 to form what resembles a paddle wheel. A second hollow bearing shaft 60 is telescoped within shaft 56 through sprocket 59 and is fixed in non-rotational relationship in a mounting block, indicated generally at 62, such that shaft 56 may rotate about bearing shaft 60.

Sprocket 59 is operatively connected to outer sprocket 40 via a belt or chain 52. Preferably outer sprocket 40 and sprocket 59 are in a size ratio which effects a significantly greater speed of rotation of shaft 56 compared to the linear speed of travel of conveyor 22.

Of course it should be understood by one of ordinary skill that more than one motor could be used to separately drive conveyor 22 and shaft 56 if deemed desirable. Also when operating a dual production line on each side of conveyor 22, it is preferred that a separate driving motor be employed to drive the complementary tendon engaging and pulley assembly mounted on the opposing side of conveyor 22 in an otherwise identical manner.

A mounting block, indicated generally at 62, and shown in greater detail in FIGS. 6 and 7 is bolted to a suitable mounting plate 64 which is fixed in any conventional manner to one of the vertical support members 30 and extends rearward or to the left as shown in FIG. 1. The outer end of mounting plate 64 also serves to support sprocket 38 mounted on a shaft 41 as previously described in connection with conveyor 22.

Specifically referring to FIGS. 4–7, mounting block 62 includes four side walls 66, 68, 70 and 72 which are conventionally bolted to one another. Wall 68 is bolted to mounting plate 64 and to a pinch block 74. Suitable holes 76 are provided in walls 66 and 68 to accept and support shaft 60. The enlarged outer end 61 of shaft 60 is suitably fixed against rotation in at least one of the holes 74 by a press fit, for example, or in any other suitable conventional manner, such that shaft 56 is rotatably supported about bearing shaft 60. The enlarged outer end 61 also serves as a stop to position shaft 56 on shaft 60 between walls 66 and 68.

Pinch block 74 includes an arcuate wall surface 78 which in cross section describes an arc of a circle having a radius only slightly larger than the radius described by the travel of the outer ends of fins 58 such that the outer terminal ends of fins 58 pass in closely spaced relationship to wall surface 78.

Shaft 60 is preferably provided with a plurality of outlet ports 63 and includes a fixed inlet port plate 65 having a threaded hole 67 adapted to receive a conventional hose fitting for connection to a conventional source of water pressure, not shown. Shaft 56 also is provided with a plurality of ports 57 which are disposed between adjacent fins 58. Outlet ports 63 are disposed facing downwardly when shaft 56 is inserted and fixed in mounting block 62 such that upon rotation of shaft 56, outlet ports 63 are sequentially aligned with a set of ports 57. When water pressure is supplied to inlet port 67, water is directed through ports 63 and to a respective set of ports 57 aligned therewith during rotation of shaft 56. The water emitted from ports 57 tends to assure a tendon, completely removed from a meat fillet by the cooperative action between fins 58 and wall surface 78, will fall downwardly away from fins 58 to collection conveyor 26.

The portion of conveyor 22 on the right of the tendon pulley assembly, as viewed in FIGS. 1 and 2, forms a loading station for meat fillets, such as the tender or tenderloin removed from a turkey breast. A loading operator manually places a fillet on one of the plates 36 with an outer end of the tendon of the fillet, exposed in a prior processing step, adjacent to one of the slot 50. The operator manually places the outer exposed end of the strip of tendon 80 into and against the inner end of a slot 50 of plate 36 so that a significant length hangs downwardly below the plate 36 as illustrated in FIGS. 4 and 5.

Figure 4:
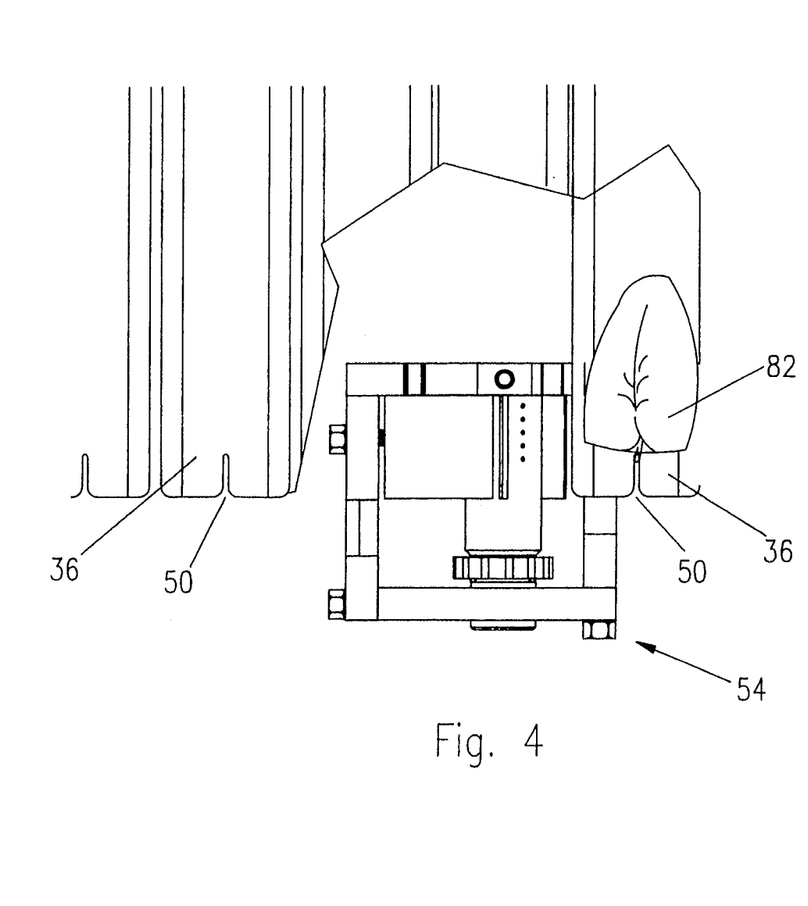
FIG. 4 is a partial top plane view of a portion of the apparatus shown in the preceding figures showing an enlarged view of the gripping and pulley assembly and part of the conveyor.
Figure 5:
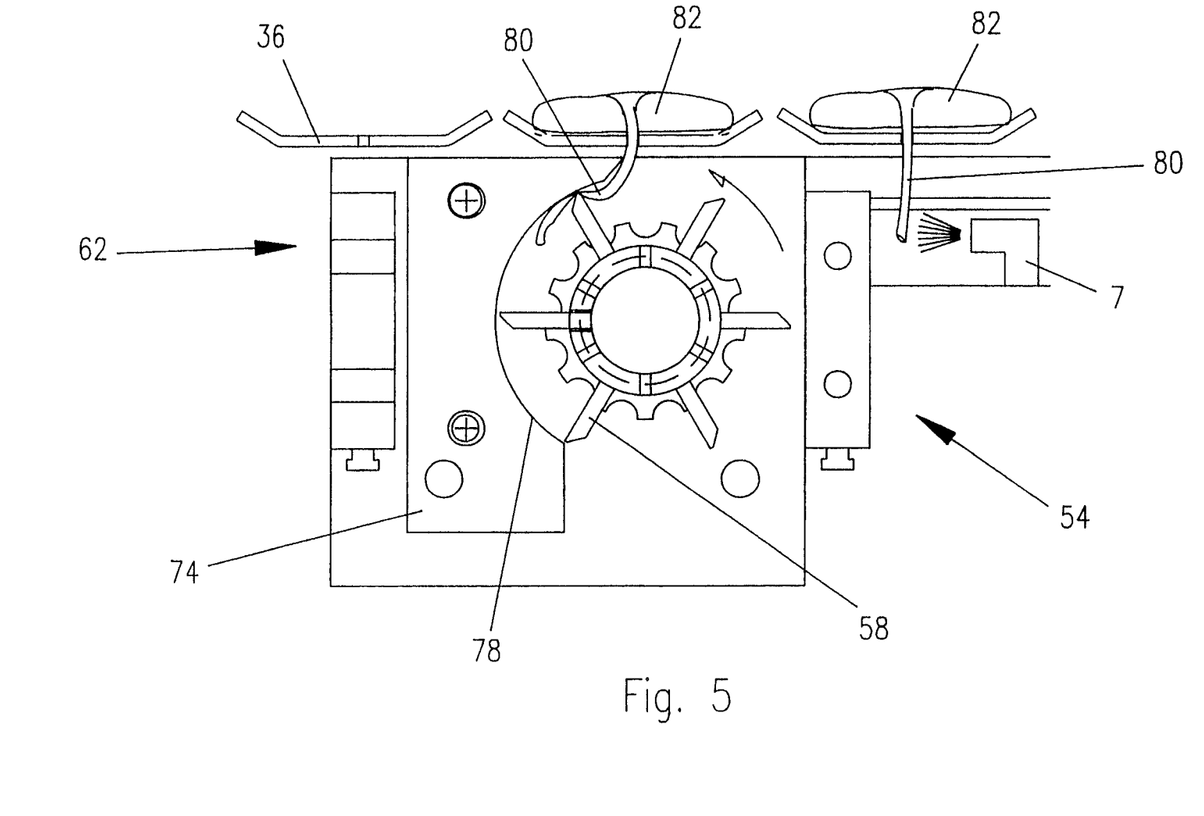
FIG. 5 is a side elevational view of the portion of the apparatus shown in FIG. 4 with a side wall of a mounting block removed to expose the assembly.

Particularly relating to removal of the tendon from turkey breast tenderloins, the tenderloin fillet is conventionally manually removed from the breast portion of a turkey so as to leave a relatively long piece of the major tendon exposed or free from the remaining fillet portion such as illustrated in FIGS. 4 and 5. This initial preparation steps is well-known for use with other prior conventional methods for manually pulling the tendon from the fillet.

Still referring to FIGS. 4 and 5, upon assembly, mounting block 62 is disposed under the upper surface of conveyor 22 as shown in the Figures to align fins 58 on shaft 56 under the path of travel of slots 50 a distance sufficiently close to ensure the strip of tendon 80 hanging downwardly in a slot 50 is engaged by one of the rotating fins 58 and carried toward wall 78. Pinch block 74 is fixed to side wall 68 to closely align arcuate wall surface 78 with the path of rotation described by the outer ends of fins 58 to provide a relatively close clearance between the outer ends of fins 58 and wall surface 78 such that a piece of tendon strip 80 is firmly entrapped or grabbed between the outer end of a fin 58 and wall 78. This described engagement and entrapment pulls tendon 80 along the wall surface 78 as a fin 58 rotates in a counterclockwise direction as viewed in FIG. 5.

It is preferred that the speed of rotation of shaft 56 carrying fins 58 is significantly greater than the linear speed of travel of conveyor 22 which can be easily controlled by the relative size of the drive sprocket arrangements described herein or in any other well-known manner understood by those of ordinary skill in the art. This assures that a tendon strip 80 is not likely to pass fins 58 without being carried into engagement between a fin 58 and wall 78.

A water spray nozzle 7 is mounted on a horizontal support member 32 adjacent to the assembly 54. Nozzle 7 is preferably located slightly inside the path of slots 50 on a slight angle pointing toward the outer edge of trays 36 and is conventionally connected to a source of water pressure, not shown. A stream of water from the nozzle 7 is directed toward the area traversed by each downwardly depending portion of tendon 80 and the rotating fins 58. This stream of water is aligned to engage the downwardly hanging portion of tendon 80 as it approaches fins 58 such that this portion of the tendon is pushed upwardly and slightly inwardly at an angle to the vertical as it is about to be engaged by a fin 58.

Particularly when the fins 58 are rotating at higher speeds, this preferred arrangement tends to assure the downwardly depending portion of tendon 80 is properly and quickly carried into initial engagement between wall surface 78 and the outer end of a fin 58 at an angle relative to its normal vertical position. It has been discovered that this tends to reduce the occurrence of two tendon strips from fillets on adjacent trays 36 from becoming simultaneously trapped between a fin 58 and wall surface 78.

After the first fin 58 engages and carries the outermost portion of tendon strip 80 into engagement with wall 78 to exert a downward pulling force, the following length of tendon strip 80 is also engaged by the next fin 58 such that the tendon is progressively grabbed and carried along the surface of wall 78 to effect a continuing strong downward pulling force on the tendon 80 until it is pulled free of the meat fillet. Preferably, the speed of rotation of fins 58 is sufficiently greater than the speed of the advancement of conveyor 22 to permit the tendon to be pulled free of the fillet relatively quickly.

A fillet stop plate 84 is fixedly mounted to one of horizontal supports 32 and extends downwardly near, but spaced above, the outer portion of the upper surface of the slots 50 of plates 36 a distance less than the thickness of the body of the meat fillet 81. Plate 84 longitudinally extends along the path of conveyor 22 a sufficient distance before and aft of the tendon pulling assembly to stop the main body of fillet 82 from being pulled off the end of a plate 36 while tendon strip 80 is being engaged and pulled downwardly by the cooperative action of fins 58 and wall 78. Therefore by restraining meat fillet 82 from lateral movement beyond the end of plate 36 in this fashion, the pulling force exerted by fins 58 is effective to pull tendon strip 80 completely free from the remainder of fillet 82.

As the tendon strip 80 is completely removed from a meat fillet 82 as described, the fillet 82 continues toward the left end of conveyor 22, as viewed in FIG. 1, to an unloading station where the stripped fillet falls into either a collection container or, if desired another conventional conveyor not shown, for collection and further processing.

The tendon strip 80 which has been removed is carried along wall 78 by a respective one of fins 58 until the opposing freed end of the strip reaches the lower end of arcuate wall 78 where it may fall downwardly into a separate collection container, or preferably, onto a conventional conveyor 26 for separate disposal along the side of conveyor 22. Preferably, the conveyor 26 is mounted within an open top tray-like housing 86 having a deeper center portion for collecting water directed downwardly from ports 57 as earlier described herein. The water jets emitted from ports 57 tend to assure the freed tendon strips do not stick to a fin 58 and fall onto conveyor 26.

A conduit 88 communicates tray 86 to a water collection tray 28 for convenient disposal of the collected water from an outlet 90.

In view of the foregoing description, it should be readily appreciated that the present invention provides an automated apparatus for removing the tough tendon from a turkey or similar meat fillet which is relatively simple in operation and yet reliably efficient to reduce manual labor costs and increase production in a safer manner compared to prior and currently used commercially used methods and means.

I claim:

1. An apparatus for the removal of a tendon from a fillet of meat comprising, in combination;

a) a supporting base;
   b) a conveyor mounted on said base and including a movable upper surface configured to receive a fillet of meat for travel along said upper surface between a loading and unloading station, said upper surface including a plurality of tendon receiving slots having an open end disposed along a lateral edge in longitudinally spaced relationship from one another;

c) a tendon removal station disposed between said loading and unloading stations and including a rotating shaft disposed below the upper surface of said conveyor and provided with at least one radially extending fin having an outer end spaced in close proximity to the path of travel of said tendon-receiving slots, a pinch block mounted on said base and including an arcuate wall surface configured to closely mate with a portion of the radial arc described by the rotation of the outer end of said radially extending fin and fixedly positioned in close clearance relationship to said outer end of said fin during a portion of its rotation with said shaft, said close clearance relationship being selected to firmly entrap an end portion of a tendon of a meat fillet between the outer end of said fin and said curved wall surface and pull said portion of tendon away from said upper surface of said conveyor and along said wall surface during rotation of said fin.

2. An apparatus for the automated removal of a tendon from a meat fillet comprising, in combination;
 a) a support base;
 b) a conveyor mounted on said base and including an upper surface mounted for movement along a selected path and configured to receive and carry a meat fillet along said path between a loading and unloading station, and including at least one tendon receiving opening disposed along a lateral edge of said upper surface;
 c) a tendon removal station disposed between said loading and unloading station and including
  i) a plurality of radially extending fins mounted to said base below said upper surface of said conveyor for rotation about a generally horizontal axis, each of said fins terminating in an outer edge aligned to pass under and adjacent to said tendon-receiving opening;
  ii) a pinch plate fixed to said base below said upper surface of said conveyor adjacent to said fins and including a convex wall surface which is closely spaced to a portion of an arc of travel of said outer edges of said fins for cooperatively engaging a strip of tendon disposed between said outer edges and said wall surface to exert a pulling force on said strip of tendon sufficient to separate the total length of said tendon from its normal connection with a meat fillet.

3. An apparatus for removal of a tendon from a meat fillet, comprising, in combination;
 a) a supporting base;
 b) a conveyor mounted on said base and including a movable mounted upper surface configured to receive and support a meat fillet for travel between a loading and an unloading station, said upper surface including a plurality of tendon receiving openings disposed along a lateral edge of said upper surface in spaced relationship from one another;
 c) a pinch plate mounted in a fixed position below said upper surface of said conveyor between said loading and unloading stations and including a curved wall surface defining in cross section a circular arc;
 d) a plurality of radially extending fins mounted for rotation about a generally horizontal axis disposed below said upper surface of said conveyor and adjacently spaced to said curved wall surface of said pinch block, the terminal outer end of said fins aligned to rotatably pass in a predetermined spaced relationship under the path of said tendon-receiving openings and in a close fit mated relationship to said curved wall surface of said pinch plate for engaging an exposed portion of a strip of tendon of a meat fillet disposed on said upper surface which is vertically depending through one of said tendon-receiving openings between successive different ones of said outer edges and said curved surface to pull said strip of tendon downwardly along said wall surface and away from said meat fillet;
 e) a motor operatively connected to said conveyor and to a shaft carrying said rotatable fins for driving said conveyor and fins along their respective paths of travel.

* * * * *